United States Patent [19]

Banas et al.

[11] 4,078,167
[45] Mar. 7, 1978

[54] WELDING SHIELD AND PLASMA SUPPRESSOR APPARATUS

[75] Inventors: Conrad M. Banas, Bolton, Conn.; Harry C. Rogers, Jr., Berwyn, Pa.

[73] Assignee: United Technologies Corporation, Hartford, Conn.

[21] Appl. No.: 767,110

[22] Filed: Feb. 9, 1977

[51] Int. Cl.² .......................... B23K 9/00; B23K 9/16
[52] U.S. Cl. ................. 219/121 R; 219/75; 219/121 L
[58] Field of Search ............... 219/75, 121 R, 121 L, 219/121 LM

[56] References Cited

U.S. PATENT DOCUMENTS

| | | | |
|---|---|---|---|
| 3,824,368 | 7/1974 | Locke | 219/121 LM |
| 3,860,784 | 1/1975 | Brown | 219/121 LM |
| 4,000,392 | 12/1976 | Banas | 219/121 LM |
| 4,010,345 | 3/1977 | Banas | 219/121 L |

Primary Examiner—E. A. Goldberg
Attorney, Agent, or Firm—Lawrence A. Cavanaugh

[57] ABSTRACT

A welding device capable of providing a blanket of nonreactive gas to isolate atmospheric gases from a weld zone to prevent weld contamination and capable of providing a stream of suppression gas across the path of a welding beam to suppress the formation of a beam absorbing plasma is disclosed. The device comprises a housing having a welding beam entrance port, a structure wall cooperating with the housing to form a first cavity therein and having an exit port aligned with the entrance port, means for supplying suppression gas to the first cavity, means for exhausting the suppression gas from the first cavity, a base cooperating with the housing and the structure wall to form a second cavity within the housing, means for providing a nonreactive gas to the second cavity, and means for passing the nonreactive gas from the second cavity to the weld zone.

12 Claims, 3 Drawing Figures

U.S. Patent    March 7, 1978    4,078,167
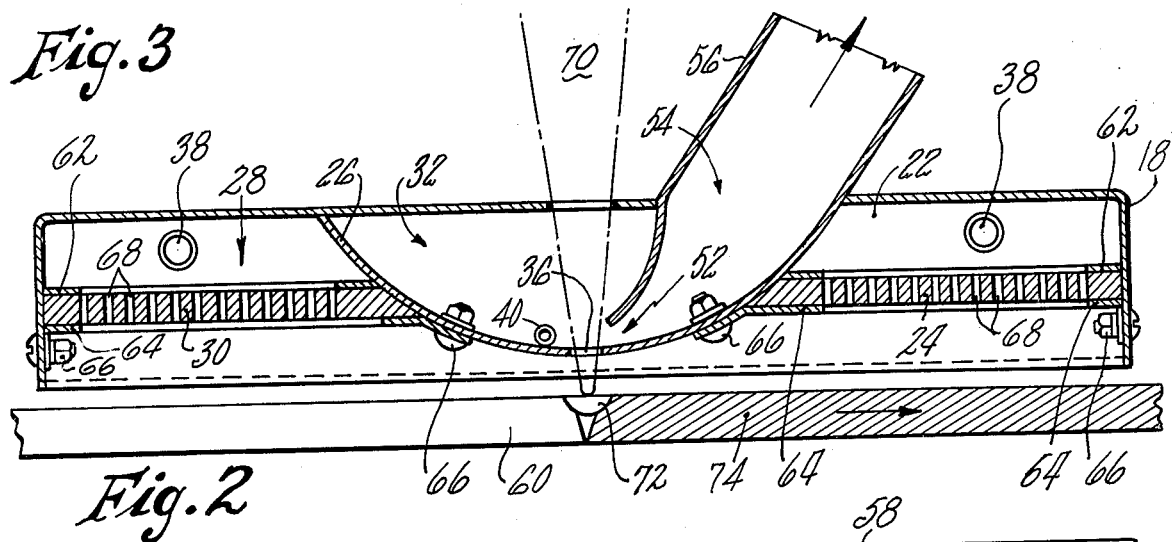
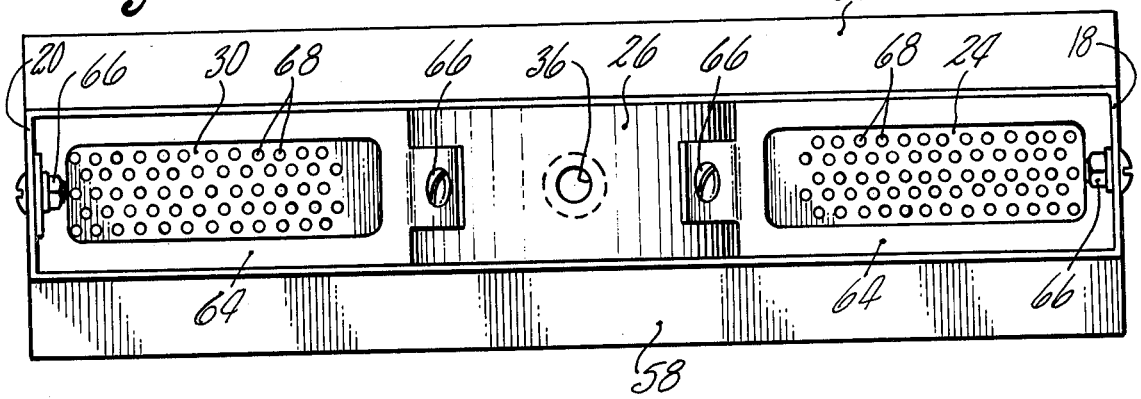
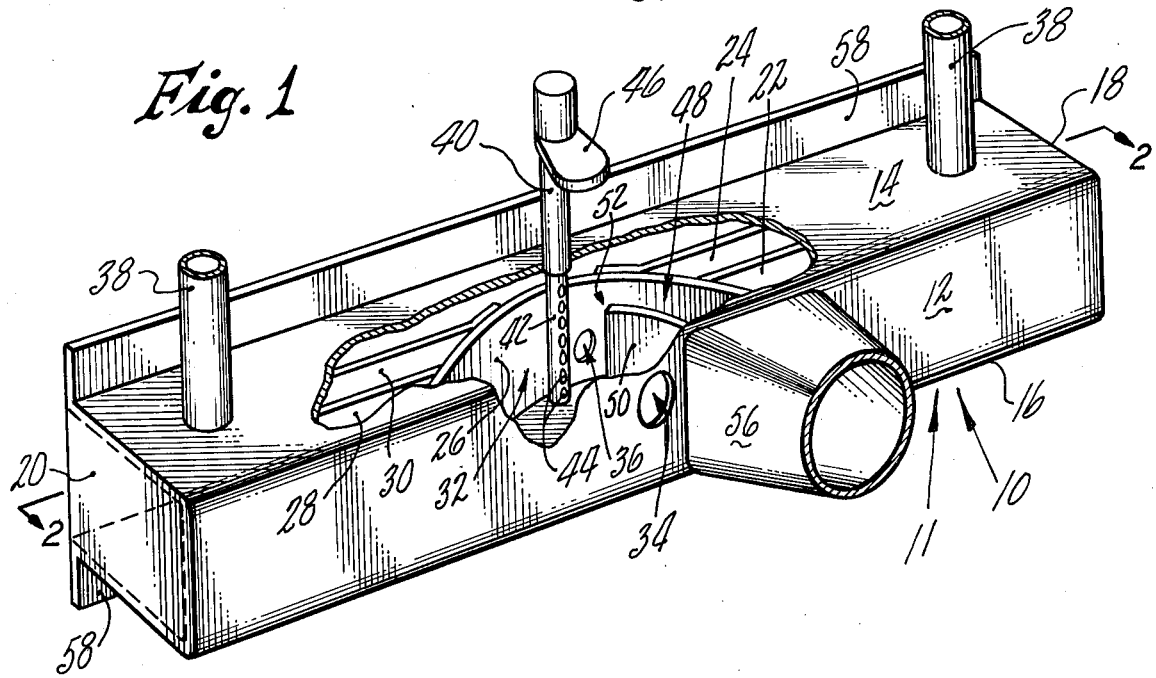

WELDING SHIELD AND PLASMA SUPPRESSOR APPARATUS

The Government has rights in this invention pursuant to Grant No. GZ-2930 awarded by the National Science Foundation.

BACKGROUND OF THE INVENTION

1. Field of the Invention

This invention relates to welding and more specifically to an apparatus for shielding a weld zone and suppressing plasma formation above a weld.

2. Description of the Prior Art

Welding by means of a beam of energy, such as a laser beam, is well known to the art. Many investigators have reported results using low or high power continuous or pulsed, laser beams to weld thin materials. A method of obtaining deep penetration welds in thick materials using carbon dioxide lasers is disclosed in U.S. Pat. No. 3,860,784 issued Jan. 14, 1975 to C. O. Brown et al. and held with the present application by a common assignee.

The generation of deep penetration welds is hindered by the problem of gas breakdown in the path of the beam. The resulting plasma defocuses and absorbs the beam which can seriously reduce the efficiency of producing welds. A mechanism of plasma generation by focusing a carbon dioxide laser beam on a solid surface is discussed in "Applied Physics Letters" Vol. 22, No. 10 at page 500 et seq. and the effects of the plasma on laser beam propagation is discussed in "Journal of Applied Physics" Vol. 46, No. 1 at page 138 et seq.

In dry air the breakdown threshold using a carbon dioxide laser beam is of the order of $10^9$ watts per square centimeter. The presence of water vapor or vapors ejected from the workpiece can reduce this threshold to the order of $10^6$ watts per square centimeter. Thus, two kilowatts of laser power can cause ionization if the beam is focused to a spot approximately 0.5 millimeter in diameter. The plasma produced by the ionization of the gas above the workpiece attenuates the beam and reduces the amount of power reaching the workpiece thereby seriously reducing the efficiency of producing a weld or even eliminating the generation of a weld. Efficient and practical deep penetration welding with laser beams requires the use of lasers having minimum power thresholds of 2 kilowatts.

Methods of solving the problem of beam attenuation by the plasma are known in the art. The introduction of a suppression gas having a high ionization potential such as nitrogen or helium across the laser beam path adjacent the workpiece can substantially raise the breakdown threshold. For a discussion of the technique of flowing a dry gas such as nitrogen across the beam path to prevent gas breakdown see a paper "Laser Welding Developments" published in "Welding Research Related to Power Plant" by Central Electricity Generating Board, London 1972. The concept is discussed also in U.S. Pat. No. 3,824,368. Flowing gas across a path of the welding beam has also been effective to minimize the contamination of beam focusing optics by the vapor and splatter ejected from the workpiece.

The problem of atmospheric contamination of the weld site associated with the more conventional welding processes such as oxi-actylene, MIG, TIG, submerged arc, electron beam, etc., is also present in the use of laser energy to weld metals. Atmospheric contamination of the weld site can be alleviated by welding in a nonreactive environment such as vacuum or inert gas. The disadvantages of welding in vacuum include limitations on the size and shape of the workpiece which can be accommodated as well as the time consumed in creating the vacuum conditions.

Welding in an inert gas environment utilizing either a total immersion technique or a trailer shield provides an alternate to welding in a vacuum. The trailer shield supplies a blanket of nonreactive gas such as argon, to the area of the workpiece over the fusion zone. The nonreactive gas covers the weld puddle and the weld zone preventing atmospheric gases from interacting with the material and contaminating the weld. The trailer shield is generally positioned such that nonreactive gas is not supplied much forward of the weld puddle.

Current laser welding practice is to flow the suppression gas in the direction of weld advance or at an angle thereto.

For a more detailed discussion of the use of suppression gas and cover gas to obtain improved welds see U.S. Pat. No. 4,000,392 entitled "Fusion Zone Purification by Controlled Laser Welding," filed on Dec. 9, 1975 and held with the present application by a common assignee.

SUMMARY OF THE INVENTION

An object of the present invention is to suppress the formation of plasma when welding with a beam of energy.

According to the present invention a welding device is provided for use with a beam of incident energy comprising a housing having an entrance port and capable of shielding a weld zone, a structure wall which cooperates with the housing to form a first cavity therein and has an exit port aligned with the entrance port, gas handling means for providing a suppression gas to the first cavity and directing said gas across the path of the beam, means for exhausting the suppression gas from the first cavity, a base cooperating with the housing and the structure wall to form a second cavity within the housing, second gas handling means for providing a nonreactive gas to the second cavity, and means for passing the nonreactive gas from the second cavity to the weld zone.

A primary feature of the present invention is to pass suppression gas into the first cavity juxtapose the exit port for suppressing the plasma in the region adjacent the weld. Also, the gas is passed transverse to the path of the beam in a direction opposite to the direction of the weld advance. Another feature is the extension on the housing to supply nonreactive gas forward the weld zone. In addition the base for passing nonreactive gas to the weld zone is removably attached to the interior of the housing. Independent means deliver the nonreactive and the suppression gas into the weld zone area. Also the direction of the suppression gas through the path of the beam can be varied. Further, exhaust means within the first cavity has a diffuser exit for attachment to exterior exhaust means.

An advantage of the present invention is the suppression of plasma in the gas above the weld. Also, increased welding efficiency is obtained by passing the suppression gas across the path of the beam in a direction opposite to the direction of the weld advance. Separate gas handling means for providing nonreactive and suppression gas allows each of the gases to be optimized for its primary function. Another advantage is the ability to control the exhaust of material vapors when welding toxic materials. Also contamination of the weld with atmospheric gases is minimized by nonreactive gas supplied forward the weld zone. A further advantage is the ability to vary the amount of nonreactive gas over the workpiece. Further, the welding performance for deep penetration welds is improved in reactive and nonreactive materials.

The foregoing and other objects, features and advantages of the present invention will become more apparent in the light of the following detailed description of the preferred embodiment hereof as discussed and illustrated in the accompanying drawing.

BRIEF DESCRIPTION OF THE DRAWING

FIG. 1 is a simplified perspective view of a welding enhancement apparatus in accordance with the present invention;

FIG. 2 is a view in the direction 2 — 2 of the welding enhancement apparatus of FIG. 1; and FIG. 3 is a cross sectional view of the welding enhancement apparatus and its relation to a workpiece.

DESCRIPTION OF THE PREFERRED EMBODIMENT

A welding enhancement apparatus 10 in accordance with the present invention is shown in FIGS. 1 and 2. The basic device consists of a housing 11 having a generally rectangular cross section and includes a top 12, a front side 14, a rear side 16, a forward side 18 and a trailer side 20. A forward cavity 22 bounded by the top, the front, rear and forward sides, a base 24, and a structure wall 26 is located within the housing. Similarly, a trailer cavity 28, bounded by the top, the front, rear and trailer sides, the structure wall, and a trailer base 30 is also located within the housing. A suppression cavity 32 bounded by the structure wall and the top is approximately centrally positioned within the housing between the forward cavity and the trailer cavity. The suppression cavity has an entrance port 34 in the top 12 and an exit port 36 which is in alignment with the entrance port and is located in the structure wall. Gas delivery tubes 38 and guide tube 40 are conveniently attached to the housing.

A gas delivery injector 42, rotatably and coaxially positioned within the guide tube, extends into the suppression cavity forward of and adjacent to the exit port. A plurality of orifices 44 for directing gas flow within the supression cavity is located in the gas delivery injector. Alternatively, a narrow slot may be used rather than orifices 44. An indicator 46 is attached to the injector and aligned with the orifices to identify the direction of gas flow. The gas delivery injector may be rotated about its longitudinal axis to change the suppression gas flow direction through the path of the welding beam. An exhaust channel 48 located within the suppression cavity is bounded by a partition wall 50 and the structure wall 26. The exhaust channel has a channel entrance 52 adjacent to the exhaust port and a channel exit 54 through the top as shown in FIG. 3. An exhaust pipe 56 is connected to the top and completely encloses the channel exit. A flange 58 on the bottom of the front side 14 and rear side 16 provides horizontal extension of the housing.

FIG. 3 shows a cross section view of a welding enhancement apparatus adjacent to a workpiece 60. The base 24 forming one bound of the forward cavity 22 is removably secured between a restrictor 62 which is welded to the housing walls and a bottom retainer 64 removably attached to the interior of the housing walls and the structure wall by attachment means 66, such as a screw, as shown in FIG. 2. Gas passing means 68, such as a multiplicity of apertures, are located within the base. The trailer base 30 is similarly secured to form one bound of the trailer cavity 28 and also has similar gas passing means.

In operation, a welding beam 70 is focused onto the workpiece. The beam enters the suppression cavity through the entrance port, leaves through the exit port and interacts with the workpiece to form a weld puddle 72. The beam energy is absorbed in the weld puddle and is transmitted through the workpiece, melting the workpiece material during the process. The weld bead 74 is produced by the relative motion between the workpiece and the beam. The arrows show the direction of the workpiece advance.

When welding reactive materials, the weld zone, including the weld puddle and the portion of the weld bead which is cooling to a solid is susceptible to chemical reaction with environmental gas. To avoid such reaction, provision must be made to shield the workpiece from the environment. Referring again to FIG. 1, a nonreactive gas, such as argon, is passed into the forward and trailer cavities 22, 28 by the gas delivery tubes 38. The nonreactive gas fills the cavities and passes through the gas passing means 68 in the bases 24, 30 providing a uniform blanket of nonreactive gas which flows over the workpiece, through the passage between flange 58 and the workpiece, and into the atmosphere. The flow of nonreactive gas removes the reactive gases from the weld zone and prevents atmospheric gases from flowing into the weld zone.

The flow rate of nonreactive gas is controlled to supply a sufficient quantity of gas to shield the weld zone from reactive gases, but not cause turbulence of the molten material which produces porous and uneven welds.

The bases 24, 30 through which the nonreactive gases flow, are replaceable to allow optimization of the gas passing means 68, such as the multiplicity of apertures in the base material as shown in FIG. 2 or a gas pervious membrane in the base, for various nonreactive gas-workpiece combinations, replacement when the gas passing means becomes impervious to gas or damaged, and replacement to vary the length of the blanket of nonreactive gas.

The optimum length of the blanket of nonreactive gas varies with the welding speed and with the thermal properties of the material being welded. As laser power is increased the welding speed increases and the length of the weld zone at elevated temperature increases; this increases the length of the weld zone susceptible to contamination by atmospheric gases. Thus, as the welding speed increases, the length of the trailer base required to insure adequate nonreactive gas coverage increases. Also, weld zones in materials having low thermal conductivities retain elevated temperatures longer than weld zones in materials having high thermal conductivities and require a comparatively longer trailer base to insure nonreactive gas coverage. The length of the base 24 of the forward cavity can also be varied in the same manner as the trailer base to provide extended nonreactive gas coverage forward of the weld zone.

Referring again to FIG. 3. In welding operation, lasers having power densities of $10^6$ watts per square centimeter or greater, incident on the workpiece surface, will vaporize the surface material and produce a material vapor. The material vapor then propagates away from the material surface along the path of the beam radiating its energy and increasing the temperature of the atmospheric gases. The electromagnetic field of the laser beam interacts with the atmospheric gas having an elevated temperature and forms a plasma. The energy of the welding beam incident on the workpiece is substantially decreased by beam absorption within the plasma, which degrades or eliminates the welding performance. The introduction of a gas having a high ionization potential into the path of the laser beam slightly upstream of the material vapor will inhibit the formation of the air plasma.

In operation a suppression gas, such as helium, flows through the gas delivery injector 42, through the orifices 44 and into the suppression cavity 32. The gas delivery injector is positioned within the suppression cavity forward of and adjacent to the exit port 36, to supply the flow of suppression gas across the path of the welding beam. The suppression gas displaces the atmospheric air in the path of the welding beam, raises the ionization breakdown threshold, and eliminates the formation of plasma.

The orifices 44 located on one side of the gas delivery injector provides the flow of suppression gas across the path of the laser beam in the direction of workpiece advancement, as shown by the arrow, which is opposite to the direction of weld advancement. This preferred direction enhances plasma suppression.

The plasma formed adjacent the workpiece surface is not continuous but actually comprises a series of intermittently generated plasma balls with only one ball existing directly above the material surface at any instant of time. As the plasma ball propagates away from the surface, it reaches a point for which the energy intensity is insufficient to sustain it. The ball is extinguished and another ball is generated at the material surface. In the process of welding, the workpiece continuously advances and successive plasma balls are formed slightly displaced from one another. By flowing the suppression gas in the direction of the workpiece advance, less plasma is aspirated into the path of the laser beam than in the heretofore method of supplying the suppression gas in a direction other than the preferred direction.

The nonreactive gas supplied forward of the weld puddle by the forward shield cavity 22 prevents the aspiration of atmospheric and other contamination gases into the weld, and allows the suppression gas to flow in the preferred direction.

Further, since the structure wall 26 protects the major portion of the weld zone and the shielded regions, substantially higher suppression gas flow rates are possible without disturbance to the weld zone or disruption of the blanket of nonreactive gas.

For laser welding, both the nonreactive gas and the suppression gas composition must be selected on the basis of gas breakdown characteristics as well as weld zone metallurgical requirements. Argon gas is an adequate nonreactive gas for most materials but has poor plasma suppression characteristics. Helium gas has been found to be a good plasma suppression gas. The structure wall 26 is welded to the top 12 and the front and rear sides of the housing forming a gas tight point at the attachment point to prevent the nonreactive gas, for example argon, in the forward and trailer cavities from entering the suppression cavity, mixing with the suppression gas, for example helium, and decreasing the ionization potential of the gas within the path of the welding beam.

The suppression gas also mixes with the material vapors ejected and/or aspirated into the path of the welding beam and the mixture enters the channel entrance 52 of the exhaust channel 48. The gas flows through the exhaust channel, through the channel exit 54 and into the exhaust pipe 56. The channel exit forms a diffuser to reduce the velocity of the gases as they exit from the suppression cavity. The exhaust pipe can be attached to a pressure means to assist the evacuation of the gas from the cavity. The exhaust pipe can also be vented to the atmosphere. In welding toxic materials, the exhaust of the material vapors can be controlled by containment means (not shown) connected to the exhaust pipe. Passing the material vapors through the exhaust channel also minimizes the problem of absorption coatings being deposited on the focusing optics which inhibits the transmission of the welding beam.

While this invention has been described in its preferred embodiment, it will be apparent to those skilled in the art that modifications may be made to the apparatus without departing from the scope of the invention as hereinafter claimed.

Having thus described a typical embodiment of our invention that which we claim as new and desire to secure by Letters Patent of the United States is:

1. A welding enhancement apparatus to provide nonreactive gas over a weld zone and suppression gas through the path of a welding beam comprising:
   a housing having an entrance port and capable of shielding a weld zone;
   a structure wall which cooperates with the housing to form a first cavity therein and has an exit port aligned with the entrance port;
   gas handling means for providing suppression gas to the first cavity and directing said gas across the path of the beam;
   means for exhausting the suppression gas from the first cavity;
   a base cooperating with the housing and structure wall to form a second cavity within the housing;
   second gas handling means for providing a nonreactive gas to the second cavity; and
   means for passing the nonreactive gas from the second cavity to the weld zone.

2. The apparatus in accordance with claim 1 including further a bottom retainer for supporting the base, and attachment means for removably securing the bottom retainer to the housing.

3. The apparatus in accordance with claim 2 including further a restrictor fixedly attached to the housing and cooperating with the bottom retainer to securely position the base therebetween.

4. The apparatus in accordance with claim 1 wherein the means for passing the nonreactive gas from the second cavity to the weld zone is the base containing a multiplicity of apertures.

5. The apparatus in accordance with claim 1 wherein the means for passing the nonreactive gas from the second cavity to the weld zone is a gas pervious membrane in the base.

6. The apparatus in accordance with claim 1 wherein the means for exhausting the suppression gas from the first cavity comprises:
 means defining a gas exhaust channel communicating at one end with the path of the beam adjacent to the exit port;
 exhaust means; and
 means connecting the exhaust means to means defining a gas exhaust channel.

7. The apparatus in accordance with claim 1 wherein the gas handling means for providing the suppression gas to the first cavity and directing said gas across the path of the beam comprises:
 a guide tube;
 an injector tube rotatably and coaxially positioned within the guide tube; and
 orifice means in the injector tube for directing the flow of suppression gas.

8. The apparatus in accordance with claim 7 wherein the orifice means provides a flow of suppression gas transverse to the path of the beam in a direction opposite to the direction of weld advance.

9. The apparatus in accordance with claim 8 wherein the orifice means is a plurality of apertures perpendicular to the path of the beam.

10. The apparatus in accordance with claim 1 wherein the gas handling means is located juxtaposed the exit port in the first cavity.

11. A welding enhancement apparatus, to provide nonreactive gas over a weld zone and suppression gas through the path of a welding beam comprising:
 a housing having an entrance port and capable of enclosing a weld zone;
 a structure wall which cooperates with the housing to form a first cavity therein and has an exit port aligned with the entrance port;
 gas handling means for providing suppression gas to the first cavity and directing said gas across the path of the beam;
 rotation means for rotating the gas handling means about its longitudinal axis;
 means for exhausting the suppression gas from the first cavity;
 a base cooperating with the housing and structure wall to form a second cavity within the housing;
 second gas handling means for providing a nonreactive gas to the second cavity; and
 means for passing the nonreactive gas from the second cavity to the weld zone.

12. The apparatus in accordance with claim 11 wherein the gas handling means comprises:
 a guide tube;
 an injector tube rotatably and coaxially positioned within the guide tube having a slot in the tube normal to the path of the beam for directing the flow of suppression gas; and
 indicator means for identifying the angular position of the slot in the injector tube.

* * * * *